(12) United States Patent
Gregerson

(10) Patent No.: US 12,472,450 B2
(45) Date of Patent: *Nov. 18, 2025

(54) FILTER APPARATUS WITH VENTED CORE

(71) Applicant: ENTEGRIS, INC., Billerica, MA (US)

(72) Inventor: Barry L. Gregerson, Deephaven, MN (US)

(73) Assignee: ENTEGRIS, INC., Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/657,561

(22) Filed: May 7, 2024

(65) Prior Publication Data

US 2024/0293764 A1   Sep. 5, 2024

Related U.S. Application Data

(62) Division of application No. 17/527,892, filed on Nov. 16, 2021, now Pat. No. 12,005,379.

(60) Provisional application No. 63/116,451, filed on Nov. 20, 2020.

(51) Int. Cl.
| | |
|---|---|
| *B01D 29/11* | (2006.01) |
| *B01D 29/96* | (2006.01) |
| *B01D 35/30* | (2006.01) |
| *B01D 35/34* | (2006.01) |

(52) U.S. Cl.
CPC .......... *B01D 29/117* (2013.01); *B01D 29/114* (2013.01); *B01D 29/96* (2013.01); *B01D 35/306* (2013.01); *B01D 35/34* (2013.01); *B01D 2201/295* (2013.01); *B01D 2201/302* (2013.01); *B01D 2201/305* (2013.01); *B01D 2201/4015* (2013.01)

(58) Field of Classification Search
CPC .... B01D 29/117; B01D 29/114; B01D 29/96; B01D 35/306; B01D 35/34; B01D 2201/295; B01D 2201/302; B01D 2201/305; B01D 2201/4015; B01D 29/15; B01D 2201/303; B01D 36/001; B01D 63/06; B01D 63/063; B01D 65/00; B01D 65/003; B01D 2313/04; B01D 2313/16; B01D 2313/20; B01D 2313/90; B01D 35/30; B01D 29/11
See application file for complete search history.

(56) References Cited

U.S. PATENT DOCUMENTS

| | | |
|---|---|---|
| 4,878,924 A | 11/1989 | Yano et al. |
| 5,154,453 A | 10/1992 | Nishio |
| 6,409,222 B1 | 6/2002 | Donoho et al. |
| 6,412,832 B1 | 7/2002 | Donoho et al. |
| 6,601,879 B2 | 8/2003 | Donoho et al. |
| 6,776,440 B2 | 8/2004 | Nishio |
| 6,955,754 B2 | 10/2005 | De Sylva |

(Continued)

FOREIGN PATENT DOCUMENTS

| | | |
|---|---|---|
| CN | 202366538 U | 8/2012 |
| CN | 110947220 A | 4/2020 |

(Continued)

*Primary Examiner* — Waqaas Ali

(57) ABSTRACT

Described are liquid filter apparatuses that include a housing, an interior within the housing, a cartridge assembly (otherwise known as a "filter cartridge") contained within the housing, and a vent that allows gaseous fluid from an interior of the housing to be released to an exterior of the housing, as well as related methods.

14 Claims, 6 Drawing Sheets

(56) References Cited

U.S. PATENT DOCUMENTS

| | | | |
|---|---|---|---|
| 6,973,705 | B2 | 12/2005 | Leys et al. |
| 7,081,201 | B2 | 7/2006 | Bassett et al. |
| 8,431,023 | B2 | 4/2013 | Berland et al. |
| 9,757,666 | B2 | 9/2017 | Lin |
| 9,770,702 | B2 | 9/2017 | Boday et al. |
| 9,808,840 | B2 | 11/2017 | Al-Shafei et al. |
| 2005/0178707 | A1 | 8/2005 | Girondi |
| 2009/0001019 | A1 | 1/2009 | Frometa et al. |
| 2011/0062061 | A1 | 3/2011 | Chajec |
| 2015/0209698 | A1 | 7/2015 | Morris et al. |
| 2019/0030472 | A1* | 1/2019 | Soma ............ B01D 29/21 |
| 2019/0091617 | A1 | 3/2019 | Jaber et al. |
| 2020/0360842 | A1 | 11/2020 | Keskin et al. |

FOREIGN PATENT DOCUMENTS

| | | |
|---|---|---|
| DE | 826668 C | 1/1952 |
| EP | 0405447 A2 | 1/1991 |
| JP | S5620061 U | 2/1981 |
| JP | H11104625 A | 4/1999 |
| JP | H11253933 A | 9/1999 |
| JP | 2003210912 A | 7/2003 |
| KR | 20130002659 A | 1/2013 |
| KR | 20180078371 A | 7/2018 |
| WO | 0137969 A1 | 5/2001 |
| WO | 2019160977 A1 | 8/2019 |

\* cited by examiner

FILTER APPARATUS WITH VENTED CORE

This application is a divisional of U.S. patent application Ser. No. 17/527,892, filed Nov. 16, 2021, which claims the benefit under 35 U.S.C. § 119 of U.S. Provisional Patent Application No. 63/116,451, filed Nov. 20, 2020, the disclosure of each of which is hereby incorporated herein by reference in their entirety.

FIELD

The invention relates to liquid filter apparatuses that include a housing, an interior within the housing, a cartridge assembly (otherwise known as a "filter cartridge") contained within the housing, and a vent that allows gaseous fluid from an interior of the housing to be released to an exterior of the housing.

BACKGROUND

Liquid filtration systems allow for the preparation and control of flows of purified, e.g., high purity, liquids. These systems have a broad range of uses, including uses in chemical processing and manufacturing industries e.g., for pharmaceuticals, food processing and packaging, industrial and commercial chemicals and chemical products, and for processing liquids for use in semiconductor and microelectronic processing. For semiconductor and microelectronic processing, liquid filtration systems are used for filtering liquids used to manufacture solar panels, flat panel displays, and semiconductor and microelectronic devices. The liquids may be used in a process such as photolithography, bulk chemical delivery, chemical mechanical processing (CMP), wet etching, or cleaning, among other types of processes.

Various designs of filter assemblies used for processing (filtering) liquids include a multiple piece filter housing that defines an interior that contains a filter membrane that removes impurities from the liquid as liquid passes through the membrane. In use, liquid is caused to flow through the interior in a flow path that includes flow through the filter membrane. The filter membrane is a component of a replaceable filter cartridge (or "cartridge assembly") that can be removed from the housing and replaced after a period of use.

The housing of such a filter assembly typically includes two main outer structures: a manifold and a bowl. The manifold includes a fluid inlet through which fluid (unfiltered liquid) passes to enter the filter housing, and a fluid outlet through which fluid (filtrate) passes to exit the filter assembly after passing through the filter membrane. Between the inlet and the outlet, the fluid must pass through the porous filter membrane. The filter membrane is supported by the replaceable filter cartridge, which is contained in the housing. The bowl includes an open end that engages the manifold and forms a liquid-tight seal between the manifold and the bowl.

A standard installed arrangement of this type of filter assembly is with a manifold connected to an input conduit and an output conduit. The input conduit is connected to the manifold inlet, which directs an incoming flow of unfiltered liquid into the housing. The output conduit is connected to the manifold outlet to receive a flow of fluid (i.e., a "filtrate") that exits the assembly through the manifold output after the fluid has passed through the filter membrane.

Standard installed arrangements of such filter housing assemblies are designed to be mounted with the bowl extending vertically downward below the manifold. This arrangement is often referred to as a standard or "bowl-down" configuration. When mounted this way, with the manifold situated above the housing, a vent port may be included in the manifold, and may be selectively opened to release air or other gas that accumulates within the filter assembly at an upper portion of the housing, to an exterior location. At start up or during use, with example filter assemblies, when filtering a liquid fluid, a volume of gas (e.g., air) may accumulate at an inner space of the filter cartridge, e.g., at an inner core volume located within a central channel of the filter cartridge contained within the housing.

In certain applications, for example for use of these filter apparatuses by semiconductor manufacturers, a more preferred installed arrangement of this type of liquid filtering apparatus may be with the cartridge assembly and the bowl of the housing being located above the manifold in an inverted, or "bowl-up" configuration. A bowl-up configuration has advantages, but also challenges that stem from the different configuration. The bowl-up configuration allows plumbing (an inlet conduit and an outlet conduit) that connects to the manifold to be located at a lower portion or a bottom of the filter apparatus, in line with the manifold and below the bowl and the filter cartridge. This may be preferred because this arrangement positions the bowl and the cartridge assembly at a more accessible location, above the manifold, and can also result in more efficient drainage of the filter during a filter replacement step.

However, a bowl-up orientation renders a venting feature through the manifold non-operational because the vent is located at the bottom of the filter assembly, and gaseous fluid that accumulates within the housing, e.g., within the inner space of the filter cartridge (i.e., a "cartridge core volume," or "core volume" for short), can accumulate at the top of the filter apparatus, i.e., at the top of the bowl.

A venting feature of a liquid filtering apparatus can be important for at least two significant reasons. One reason is to prevent reduced performance of the filtering apparatus due to the presence of a gas pocket within the filter housing during use. A second (not entirely unrelated) reason is to prevent the risk of electrostatic discharge.

Regarding the former, if an interior of a housing of a liquid filtering apparatus contains a pocket of trapped air or another gaseous fluid, the liquid that is passing through the housing may not contact the entire area of the filtration membrane, and the membrane can become de-wetted. De-wetting may be a concern with different types of filter membranes, such as hydrophobic filter membrane.

The second concern is electrostatic discharge. Filter housings, structures and components of the housing are typically made of chemically resistant polymeric materials, which are non-conductive (insulative). If a liquid that is passing through the filter housing also has low electrical conductivity, significant electrostatic charge can build up within the filter housing, the fluid within the system, or a component or structure thereof. The charge build-up creates a risk of electrostatic discharge. A volume of trapped air at an upper region of a liquid filtering apparatus housing causes turbulent flow or free falling of the liquid flowing through the filter cartridge, which can cause a buildup of electrostatic charge within the liquid, filter apparatus, structures or housing.

In more detail, buildup of electrostatic charge in a filtering system can occur due to frictional contact between a flow of liquid fluid through a filtering system, and surfaces of the filtering system (e.g. tubing, conduits, piping, valves, fittings, filter housings, and filter cartridges, etc.). Charge build can be increased by uneven or turbulent flow of liquid through a filter housing caused by a volume of gas in the filter housing, particularly gas located at the core volume at the interior of the filter cartridge assembly. The magnitude of a charge buildup will be affected by factors such as the nature (e.g., chemical makeup) of the housing, the type and composition of the liquid that passes through the housing, the velocity of the liquid, viscosity of the liquid, electrical conductivity of the liquid, pathways to ground, turbulence and shear in the liquid, the presence and location of air in the fluid of fluid handling system (e.g. filter apparatus), and the size of a contact area between the fluid and fluid handling components.

Further, as fluid flows through a fluid handling system, the charge can be carried downstream in a phenomenon called a streaming charge, whereby electrical charge may build at a location that is different from the location at which the charge originates. A sufficient amount of charge accumulation can cause electrostatic discharge at a structure of a component of a fluid handling system, e.g., filter apparatus. Potentially, however, the discharge may occur may occur at a different location that is connected to the fluid handling system, such as at processing equipment (e.g., a semiconductor manufacturing tool) connected to and supplied by the fluid handling system.

Semiconductor and microelectronic device substrates can be highly sensitive to static electrical charges. Electrostatic discharge that involves a semiconductor or microelectronic device substrate can result in damage to or destruction of the substrate. For example, circuits on the substrate can be destroyed and photoactive compounds can be activated prior to regular exposure due to uncontrolled electrostatic discharge. Additionally, built up static charge can discharge from within a fluid handling system to an exterior environment, potentially damaging components of the fluid handling system (e.g. tubing or piping, fittings, components, containers, filters, etc.), possibly resulting in damage to the fluid handling system that could be the cause of a leak, spills of fluid in the system, or diminished performance. In some environments discharge, may lead to potential fire, explosion, or safety hazard if a fluid handled by the system is flammable, toxic, or corrosive.

In some fluid handling systems, to reduce the buildup of static charges, certain metal or conductive components are connected to electrical ground to mitigate the buildup of static charge in the system. Conventional use of multiple grounding straps may lead to undue mechanical clutter in a fluid handling system, and may lead to a complex grounding system network requiring extensive maintenance or a complex system that may be susceptible to failure.

It would be desirable to improve electrostatic mitigation systems and techniques in fluid handling systems, including filter apparatuses, for improved performance and to reduce the risk of potentially damaging electrostatic discharge events.

SUMMARY

The present disclosure, in certain respects, provides filtering apparatuses that include improved venting features, particularly with respect to venting a gaseous fluid from an inner core volume within a filter cartridge of a liquid filtering apparatus, during use of an apparatus installed in a bowl-up configuration.

Also according to certain example embodiments, a liquid filtering apparatus can alternately or additionally include a electrostatic charge-dissipation feature, also referred to as an ESD mitigation feature. The ESD mitigation feature may be incorporated into the apparatus by constructing any one or more components of the apparatus of electrically conductive material, e.g., conductive polymer or conductive fluoropolymer. In example apparatuses, a vent feature or other component of a housing can be made of conductive material such as electrically conductive polymers or hybrid conductive/non-conductive polymer structures. When present, the electrically conductive structure, such as a vent tube, is coupled to the housing, and eventually to electrical ground to mitigate the risk of ESD. In some embodiments, a conductive fitting extending through an insulative polymer manifold completes a circuit from the electrical path within the filter core to ground (e.g., an electrical connection can be made between the vent tube and ground).

In one aspect, the invention relates to a liquid filtering apparatus. The apparatus includes: a bowl that comprises an open end, a distal end opposite of the open end, and an interior that extends between the open end and the distal end; a manifold that is capable of sealingly engaging the open end of the bowl, the manifold comprising a fluid inlet and a fluid outlet; a cartridge assembly disposed at the interior. The cartridge assembly includes a filter membrane, a cartridge assembly proximal end, and a cartridge assembly distal end. The cartridge assembly proximal end includes a surface that is adapted to contact a surface of the manifold to form a cartridge assembly-manifold seal. The cartridge assembly distal end includes a surface that is adapted to contact an interior surface of the bowl to form a cartridge assembly-bowl seal at the interior. The apparatus also includes: a core volume at a central inner side of the cartridge assembly; a housing volume at an outer side of the cartridge assembly between the cartridge assembly and the housing; and a vent that extends through the bowl distal end to the core volume to fluidly connect the core volume with an exterior of the liquid filtering apparatus.

In another aspect, the invention relates to a method of filtering a liquid using a liquid filtering apparatus that includes a housing that includes a manifold and a bowl, with the bowl situated vertically above the manifold. The housing includes the bowl, which includes an open end, a distal end opposite of the open end, and an interior that extends between the open end and the distal end; the manifold, which is engaged with the open end of the bowl to form a manifold-bowl seal, the manifold comprising a fluid inlet and a fluid outlet; a cartridge assembly disposed at the interior, the cartridge assembly comprising a filter membrane, a cartridge assembly proximal end, and a cartridge assembly distal end, the cartridge assembly proximal end including a surface that is adapted to contact a surface of the manifold to form a cartridge assembly-manifold seal, and the cartridge assembly distal end including a surface that is adapted to contact an interior surface of the bowl to form a cartridge assembly-bowl seal at the interior; a core volume at a central inner side of the cartridge assembly; a housing volume at an outer side of the cartridge assembly between the cartridge assembly and the bowl; and a vent extending through the bowl distal end to the core volume to fluidly connect the core volume with an exterior of the bowl. The method includes: passing liquid through the apparatus by passing the liquid in the inlet, from the inlet through the housing volume, through the filter membrane, to the core volume, and then through the outlet, wherein gas accumulates at a distal region of the core volume; and releasing the gas through the vent.

In yet another aspect, the invention relates to a method of replacing a cartridge assembly of a liquid filtering apparatus that includes a housing that includes a manifold and a bowl, with the bowl situated vertically above the manifold. The housing includes: the bowl, which comprises an open end, a distal end opposite of the open end, and an interior that extends between the open end and the distal end; the manifold, which is engaged with the open end of the bowl to form a manifold-bowl seal, the manifold comprising a fluid inlet and a fluid outlet; a cartridge assembly disposed at the interior, the cartridge assembly comprising a filter membrane, a cartridge assembly proximal end, and a cartridge assembly distal end, the cartridge assembly proximal end including a surface that contacts a surface of the manifold to form a cartridge assembly-manifold seal, and the cartridge assembly distal end including a surface that contacts an interior surface of the bowl to form a cartridge assembly-bowl seal at the interior; a core volume at a central inner side of the cartridge assembly; a housing volume at an outer side of the cartridge assembly between the cartridge assembly and the bowl; and a vent extending through the bowl distal end to the core volume to fluidly connect the core volume with an exterior of the bowl. The method includes: draining liquid fluid from the liquid filtering assembly; disassembling the manifold-bowl seal; vertically lifting the bowl and the cartridge assembly above the manifold to produce vertical clearance between the bowl and the manifold, and between the cartridge assembly and the manifold; and moving the bowl and the cartridge assembly together laterally to produce clearance between the manifold and the bowl, and between the manifold and the cartridge assembly.

DETAILED DESCRIPTION

Figure 1:
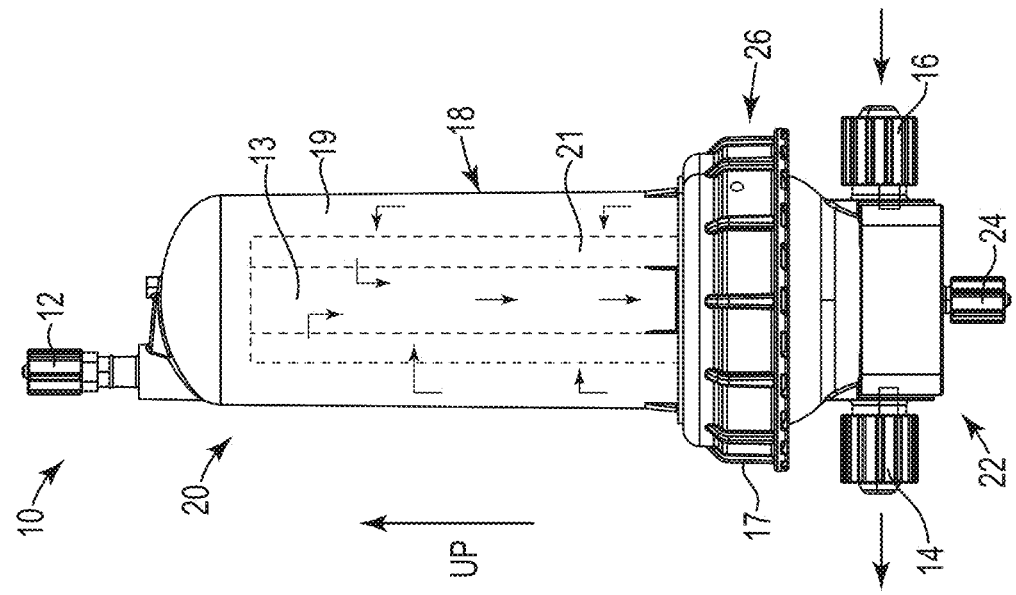
FIG. 1 shows a filter apparatus in a bowl-down configuration.

The present description relates to novel and inventive systems that involve improvements to liquid filtering apparatuses. In certain particular non-limiting examples, the description relates to liquid filtering apparatuses that may be operated in a bowl-up orientation, and that include a venting feature that extends through the bowl for venting a core volume within the interior of the liquid filtering apparatus.

This description also relates to liquid filtering apparatuses that alternately or additionally incorporate a system for mitigating electrostatic charge buildup in a liquid filtering apparatus, or in an adjacent structure, to mitigate the risk of electrostatic discharge (ESD) from the filter apparatus or a connected flow control apparatus or other type of apparatus.

A liquid filtering apparatus as described is of a type that includes a housing (sometimes referred to as a "filter housing") that includes both a manifold and a bowl. The bowl has a structure that includes an open end and a distal end opposite of the open end. Between the open end and the distal end, the bowl includes a sidewall structure that also defines an interior of the bowl situated between the open end, the sidewalls, and the distal end. The "open" end refers to an end that includes an aperture or opening through which a cartridge assembly can couple, to place the cartridge assembly within the interior.

The bowl distal end is substantially closed with the exception of one or multiple vent passages through the distal end. For use of the liquid filtering apparatus in a "bowl-up" configuration, the distal end of the bowl may include an opening that allows for venting between an exterior side of the distal end and a core volume. Alternately, or additionally, the distal end of the bowl may include an opening that allows for venting between an exterior side of the distal end and a housing volume.

The housing also includes a manifold that opposed and engages the open end of the bowl to form a liquid-tight seal between the open end of the bowl and the manifold. The engagement may include a threaded engagement, a gasket, a clamp, or any other mechanical fastening engagement that will provide a liquid-tight seal between the manifold and the open end of the bowl, referred to as the "manifold-bowl seal."

When engaged with the open end of the bowl, the manifold covers the open end of the bowl to fill and close the opening and to cover the interior of the bowl. The bowl communicates with an exterior space through openings or passages in the manifold in the form of an inlet and an outlet, each of which is part of the manifold structure. The manifold inlet allows fluid (unfiltered liquid) to flow through the manifold from an exterior source and into an interior space of the housing, which may be either the filter cartridge core volume or the housing volume. The manifold also includes an outlet, which is a passage through the manifold that allows liquid to pass out of the housing, either from the core volume to a location that is exterior to the housing, or from the open side space to a location that is exterior to the housing.

The housing interior is configured to contain a cartridge assembly that contains a porous filter membrane through which unfiltered liquid that enters the housing through the inlet must flow while passing from the inlet, through the interior, and then through the outlet.

The cartridge assembly may be any structure that supports a filter membrane for use in a filter housing of a liquid filtration apparatus. Often, or typically, the cartridge contains an annular, typically cylindrical, support structure that includes opposed ends that include a proximal end (or "cartridge assembly proximal end") and a distal end (or "cartridge assembly distal end"). The filter membrane is held and supported by support structure, and sealed between the two opposed ends, and in a location that, with the cartridge assembly installed within the assembled housing, liquid that enters into the housing through the housing inlet must pass through the filter membrane for the liquid to subsequently pass through housing outlet.

The cartridge assembly can be considered to include an axis (e.g., a central axis) that extends along the length of the cartridge assembly along a center or medial location between the two opposed ends. The cartridge assembly also defines an open space at the central interior of the annular or cylindrical cartridge assembly, facing a core side of the filter membrane. The open space extends between the two opposed ends of the cartridge assembly and includes the central axis. This open space is referred to as the "core volume" of the assembled housing, is located on one side of the filter membrane (the "core side" of the filter membrane), and extends between the core side of the filter membrane and one or the other of the housing inlet or the housing outlet (typically, the housing outlet).

The cartridge assembly includes a second side, i.e., a housing side, that is opposite of the core side, that faces the housing when the cartridge assembly is installed in an assembled filter housing. The cartridge assembly and housing define a second open space at the exterior of the annular cartridge assembly, which is referred to as the "housing volume," and which is located between interior surfaces of the housing bowl, and the housing side of the cartridge assembly, also the housing side of the filter membrane. This housing volume extends between the housing side of the filter membrane, interior surfaces of the housing bowl, and one of the housing inlet or the housing outlet (typically the inlet).

The cartridge assembly proximal end is configured to engage the manifold and to produce a liquid-tight seal between the manifold and the cartridge assembly proximal end, i.e., a "cartridge assembly-manifold seal." The cartridge assembly-manifold seal provides a liquid-tight flow path between the core volume and the manifold, to allow pressurized liquid to flow between the core volume and the manifold and through either at the housing inlet or the housing outlet.

The cartridge assembly-manifold seal can be of any useful design that will provide a sealed flow path between the manifold and the cartridge assembly proximal end. Examples include threaded engagements, snap-fit engagements, and press-engagements.

For ease of removal of the cartridge assembly from the manifold during a step of replacing the cartridge assembly, a preferred engagement between the cartridge assembly proximal end and the manifold, to form the cartridge assembly-manifold seal, may be a sealed engagement that is a press-fit engagement. With this type of engagement, the cartridge assembly-manifold seal can be formed by pressing a surface of the cartridge assembly proximal end into contact with a surface of the manifold, with movement of the cartridge assembly along the central axis toward the manifold, e.g., exclusively along the direction of the axis and without rotation of the cartridge assembly relative to the central axis. Typically, the cartridge assembly proximal end includes a cylindrical outward-facing surface that aligns with and extends along the direction of the central axis of the cartridge assembly. The manifold includes an opening that defines an opposed surface that is adapted to engage the cylindrical surface of the cartridge assembly proximal end. One or more gaskets, e.g., "O-ring" type gaskets, are disposed between the opposed surfaces of the manifold and the proximal end, to form a liquid-tight seal.

The sealed engagement can be produced by pressing the proximal end into the opening of the manifold to align the two opposed surfaces, with the one or more gaskets contacting both of the opposed surfaces. When the housing is installed in a bowl-up configuration, this includes pressing the cartridge assembly in a vertically downward direction along the central axis of the cartridge assembly toward an upper face of the manifold. The sealed engagement can be disassembled by pulling the cartridge assembly proximal end surface from the surface of the manifold. When the housing is installed in a bowl-up configuration, this includes lifting the cartridge assembly in a vertically upward direction along the central axis of the cartridge assembly, away from the upper face of the manifold.

The housing, at the bowl distal end, includes a venting feature that allows venting of (removal of) a gaseous fluid from a location at the interior (core) side volume (or "core volume") to a location that is exterior to the housing. During use of a liquid filtering apparatus as described in a bowl-up configuration, e.g., with flow of liquid through the filter membrane in a direction from the housing volume (connected to the housing inlet) to the filter core volume (connected to the housing outlet), air or other gaseous fluid may collect in the upper portion of the core volume, which is also a "distal portion" of the core volume. The "upper portion" refers to the upper quarter, third, or half of the core volume when the housing is installed in a bowl-up configuration, which is also the portion of the core volume that is located at the distal end of the housing and away from the manifold. In a consistent manner, the "distal portion" refers to the quarter, third, or half of the core volume that is located at the distal end of the core, which is the end located proximal to the distal end of the bowl and away from the open end of the bowl.

According to example housing structures as described, the housing bowl in conjunction with the cartridge assembly include a venting feature that allows for fluid communication between the core volume, e.g., the upper portion (distal portion) of the core volume, and the housing exterior, to allow for removal of gaseous fluid from the core volume that may accumulate there during use of the liquid filtering apparatus.

The venting feature may include any structure that provides fluid communication between the core volume and the housing exterior. Examples include a tube, conduit, channel or other passage that that extends between the core volume and the housing exterior, and that can be used to allow gas to pass from the core volume to escape the core volume and flow to an exterior location. The venting structure may be in the form of a single integral piece, or may be an assembly of two or more pieces that together form a continuous fluidic flow path between the core volume and the housing exterior.

To provide a venting feature that provides fluid communication between the core volume and the housing exterior, a liquid filtering apparatus as described can include a fluid tight seal between an inner surface of the housing bowl and a distal end of cartridge assembly, the seal being referred to as a "cartridge assembly-bowl seal."

A cartridge assembly-bowl seal can be of any useful design that will provide a liquid-tight passage between an inner surface of the assembly-bowl and the cartridge assembly distal end. Examples include opposed threaded engagements, snap-fit engagements, and press-fit engagements. One example of a useful engagement between the cartridge assembly distal end and an inner surface of the bowl, to form the cartridge assembly-bowl seal, is a sealed engagement that is a press-fit engagement as described herein for use to form a cartridge assembly-bowl seal. With this type of engagement, the cartridge assembly-bowl seal can be formed by pressing a surface of the cartridge assembly distal end into contact with an inner surface of the bowl, with movement of the cartridge assembly along the central axis toward the distal end of the bowl. Typically, the cartridge assembly distal end may include a cylindrical outward-facing surface that aligns with and extends along the direction of the central axis of the cartridge assembly. The inner surface of the bowl includes an opening that defines an opposed surface that is configured to engage the cylindrical surface of the cartridge assembly distal end. One or more gaskets, e.g., "O-ring" type gaskets, are disposed between the opposed surfaces of the bowl and the distal end to form a liquid-tight seal between the two opposed surfaces.

The sealed engagement can be produced by pressing the distal end into the opening to align the opposed surfaces, with movement of the cartridge assembly along the central axis toward the distal end of the bowl and with the one or more gaskets contacting both of the opposed surfaces. The sealed engagement can be disassembled by pulling the cartridge assembly distal end surface away from the surface of the bowl, with movement of the cartridge assembly along the central axis and away from the distal end of the bowl.

Particular examples of liquid filtering apparatuses can include an ESD mitigation feature, which is a structure that mitigates the build of electrostatic charge in the housing, and components thereof, to mitigate the risk of a charge buildup that would be sufficient to result in an electrostatic discharge to electrical ground. According to certain (non-exclusive) examples of these features, the ESD mitigation feature can be included as part of a venting feature. Accordingly, the ESD mitigation feature can be placed at a location of a potential accumulation of gas at an upper portion of a core volume, which is a location at which electrostatic charge could originate.

Oftentimes, depending on the expected use of a liquid filtering apparatus, structures of the apparatus (e.g., bowl, manifold, components of the cartridge assembly, adjacent valves and flow conduits, etc.) are made of inert polymers that are specifically resistant to chemical degradation such as oxidation or corrosion. To meet corrosion resistance and purity requirements for such applications, fluid handling and liquid filtering components such as tubing, fittings, valves, conduits, housings, cartridge assemblies, and other items, are made from inert polymers. Examples of useful inert polymers include fluoropolymers such as tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), and fluorinated ethylene propylene polymer (FEP). In addition to providing a non-corrosive and inert construction, many fluoropolymers, such as PFA, are injection moldable and extrudable. Other polymer options viable as well such as PP or HDPE depending on the application Several types of connector fittings, made from such polymers, are available and are known, such as PRIMELOCK® fittings, PILLAR® fittings, flared fittings, and other fittings. Exemplary fittings, for example, are illustrated in U.S. Pat. Nos. 5,154,453; 6,409,222; 6,412,832; 6,601,879; 6,758,104; and 6,776,440. These types of inert polymers, however, typically exhibit a low electrical conductivity or insulative, which causes these materials and components made from them to be susceptible to the accumulation of electrostatic charge. Therefore, as described, a filter housing of the present description can include an ESD mitigation feature.

An ESD mitigation feature is a structure or portion of a structure of a housing as described that prevents the accumulation of electrostatic charge within the fluid or the housing, or removes or minimizes or reduces a generated or accumulated charge from a structure of the housing. The ESD mitigation can be a conductive element of a structure of the housing, such as a conductive component of a vent feature (e.g., a vent conduit or portion thereof), a conductive component of the housing bowl, a conductive component of the housing manifold, a conductive component of the cartridge assembly, etc., that is connected to earth ground.

The conductive component may be made of a material that is consistent with other materials of the housing, for example that may be inert. Examples include conductive polymers, especially conductive fluoropolymers. A conductive fluoropolymer may be based on non-conductive fluoropolymer that is formulated to include conductive material that causes the fluoropolymer to be sufficiently electrically conductive to be effective as part of an ESD feature. Example of such fluoropolymers include perfluoroalkoxy alkane polymer (PFA), ethylene and tetrafluoroethylene polymer (ETFE), ethylene tetrafluoroethylene and hexafluoropropylene polymer (EFEP), fluorinated ethylene propylene polymer (FEP), tetrafluoroethylene polymer (PTFE), as well as other suitable polymeric materials. Examples conductive fluoropolymers include PFA that has been combined with ("compounded" with) conductive material (e.g. compounded PFA). This loaded PFA includes, but is not limited to, PFA loaded with carbon fiber, nickel coated graphite, carbon fiber, carbon powder, carbon nanotubes, metal particles, and steel fiber. In various embodiments, a conductive component of an ESD mitigation feature can have an electrical resistivity that is level less than about $1 \times 10^6$ ohm-m, while materials that are considered to be insulative have a resistivity level greater than about $1 \times 10^6$ ohm-m. In certain embodiments, conductive components of an ESD mitigation feature have a resistivity that is below about $1 \times 10^6$ ohm-m, while materials that are considered to be non-conductive have a resistivity level greater than about $1 \times 10^6$ ohm-m.

Referring now to the Figures, FIG. 1 shows a liquid filtering assembly 10 installed in a bowl-down configuration, and that may include or may be adapted to include one or features as described herein, such as a venting feature as described, an ESD mitigation feature as described, or both. Assembly 10 includes a housing that includes housing manifold 22 and housing bowl 18. Housing bowl 18 includes distal end 20, which is located at the bottom or lower end of assembly 10 as illustrated, and open end 17, which is located at a top of bowl 18 as illustrated (in a "bowl-down" orientation) and is engaged with manifold 22. Bowl 18 is removably attached to manifold 22 at manifold-bowl seal 26, which may be a threadable engagement or another type of liquid-tight sealing engagement.

The assembled housing includes an interior at which a cartridge assembly 21 is held. Liquid to be filtered ("unfiltered liquid") enters assembly 10 at inlet 14 and is caused to follow a flow path that includes passing through inlet 14 of manifold 22, then through a filter membrane (not shown) that is supported by cartridge assembly 21, and subsequently exiting assembly 10 at outlet 16 (see arrows indicating an exemplary flow path of liquid through assembly 10). Relative to cartridge assembly 21 and bowl 18, the interior of the housing includes a core volume 13 on a core side of cartridge assembly 21 and its filter membrane, and housing volume 19 on a housing side of cartridge assembly 21 and its associated filter membrane. One or more vents can provide a path for a fluid (such as gas) to be released from the interior of the assembly on either side of the filter membrane (e.g., on a housing space side of the membrane or a core volume side of the membrane), before or after passing through the filter membrane. As shown at FIG. 1, housing vent 12 is located at distal end 20 end of bowl 18, and a core vent 24 is included as part of manifold 22. Housing vent 12 allows for fluid communication between housing volume 19 and a location exterior to the housing. Core vent 24 allows for fluid communication between core volume 13 and a location exterior to the housing.

While not specifically, shown, assembly 10 of FIG. 1 may include a feature of the present description such as an ESD mitigation device.

Figure 2:
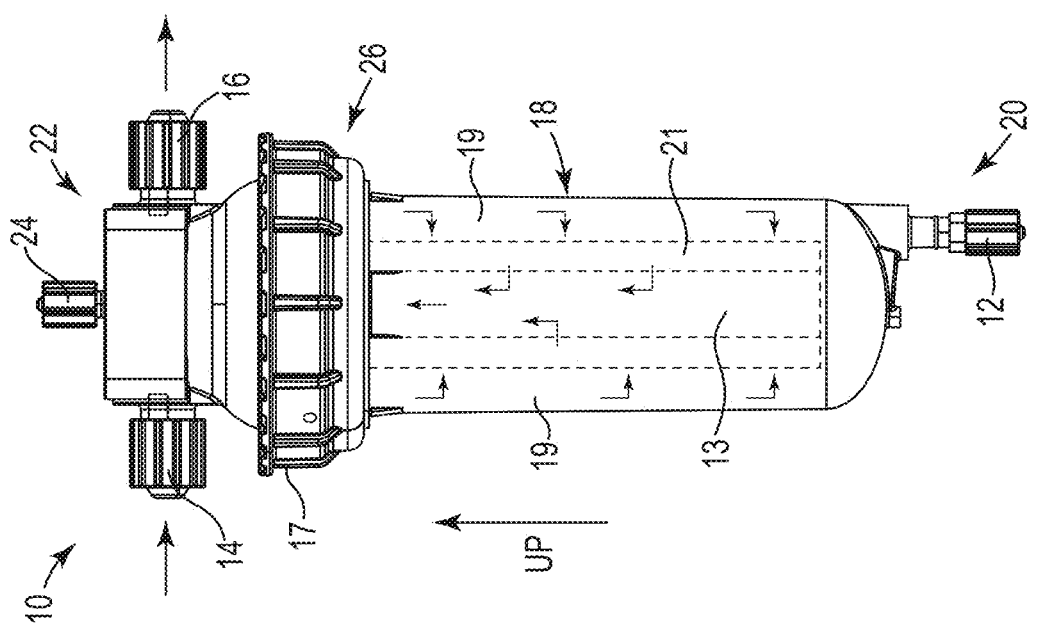
FIG. 2 shows a filter apparatus in a bowl-up configuration.

FIG. 2 shows filter apparatus 10 in an alternate bowl-up configuration. As shown, assembly 10 has substantially the same features of filter assembly 10 of FIG. 1 in the bowl-down configuration, but in a vertically inverted with bowl housing 18 located above manifold 18, and with distal end 20 of bowl 18 being locate above open end 17 of bowl 18.

Challenges arise from the bowl-up configuration of FIG. 2. For example, although not shown, a volume of a gas phase (air) may accumulate at an upper portion of core volume 13 during use of assembly to filter a liquid. Such a volume of accumulated gas at core volume 13 cannot be removed from assembly 10 through either of vent 20 or vent 24.

Alternately or additionally, core assembly 13, bowl housing 18, or both, may accumulate electrostatic charge during use of assembly 10 to filter a liquid passing through assembly 10, especially upon accumulation of a volume of gas (e.g., air) at an upper portion of core volume 13. Therefore, improved venting of the filter assembly 10 when oriented in a bowl-up configuration, and in particular of a core volume within the apparatus, would be beneficial. Improved electrostatic discharge (ESD) mitigation as electric charge is accumulated during liquid filtering would also be beneficial in a filter apparatus such as filter assembly 10 of FIG. 2.

Figure 3:
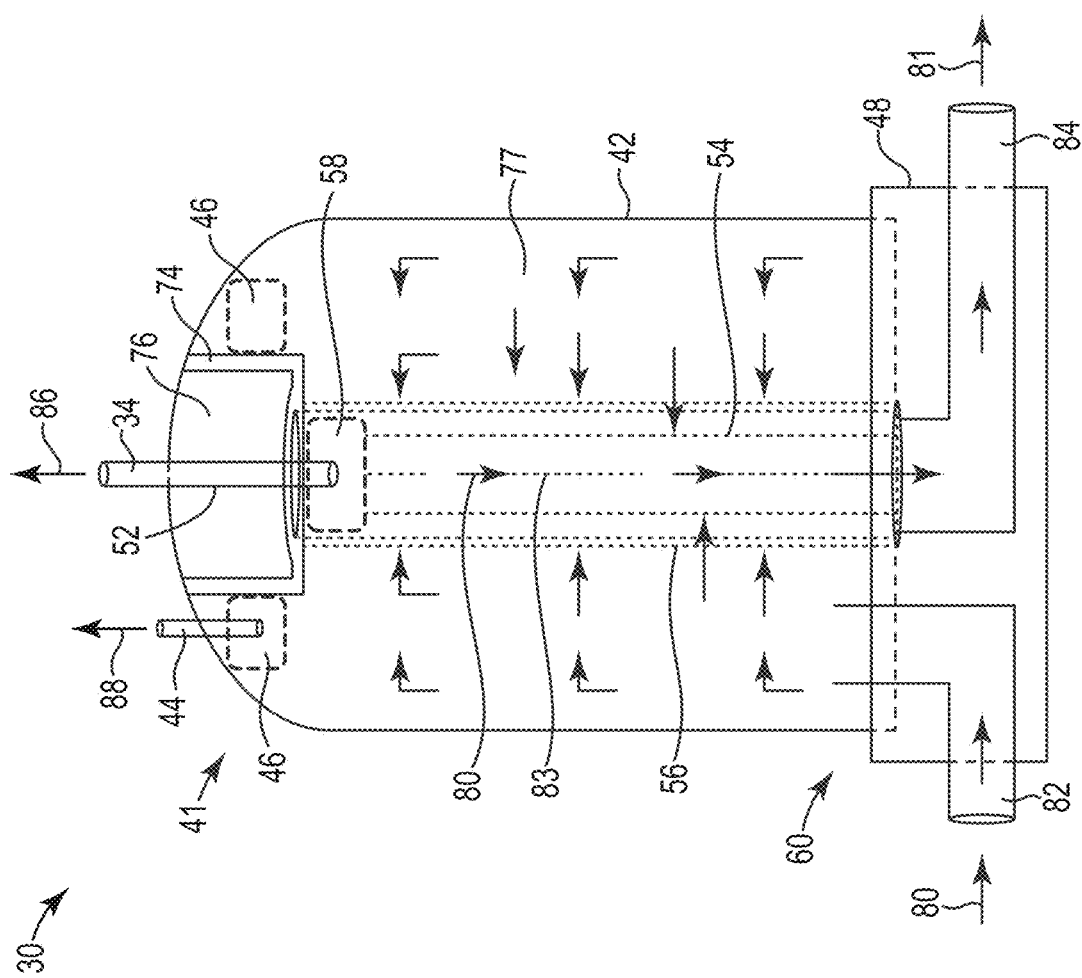
FIG. 3 is a schematic view of a filter apparatus in a bowl-up configuration with a core vent passing through a distal end of a filter housing.

Illustrated in FIG. 3 is an example of a liquid filtering apparatus (30) that includes a venting feature as described herein. Filter assembly 30 includes housing 41 that includes bowl 42 and manifold 48. Housing 41, at a distal (upper) end of bowl 42, is equipped with core vent 34 and housing vent 44. In the assembled condition as shown, manifold 48 engages an open (lower) end of housing bowl 42 at manifold-bowl seal 60. Manifold-bowl seal 60 can be a liquid-tight seal, e.g., a threadable connection, a snap-fit connection, a bayonet style twist-lock connection, or any other suitable liquid-tight sealing connection.

Manifold 48 includes passages that include fluid inlet 82 and fluid outlet 84 for connecting apparatus 30 to a fluid input conduit and a fluid output conduit (neither being shown). Liquid 80 enters inlet 82 and flows into housing volume 77, then passes through filter membrane 54 supported by cartridge assembly 56 and into core volume 83. As unfiltered liquid 80 passes through filter membrane 54, contaminants of the unfiltered liquid are removed and retained by filter membrane 54, and permeate 81 having a reduced level of contaminants is produced. Permeate 81 exits core volume 83 and flows out of assembly 30 by passing through outlet 84.

Housing bowl 42 includes core vent 34 at a distal end (upper end, when oriented in a bowl-up configuration a shown) of the housing bowl 42. Core vent 34 includes a tube, conduit, channel, or other flow path that connects core volume 83 with a location that is exterior to assembly 30. Additionally, and optionally, housing bowl 42 also includes housing vent 44, which also is located at a distal (upper) end of bowl 42, which provides for fluid communication between housing volume 77 and a location at the exterior of assembly 30.

Optionally, but not specifically illustrated, assembly 30 can include a ESD mitigation feature such as a conductive polymer located at one or more of structures of assembly 30, that connects the interior of assembly 30 to electrical ground. An example ESD mitigation feature may be structure of assembly 30 that includes a conductive polymer. For example, any one or more of housing bowl 42, core vent 34, housing vent 44, and cartridge assembly 56 may be made completely or partially of conductive polymer.

Figure 4:
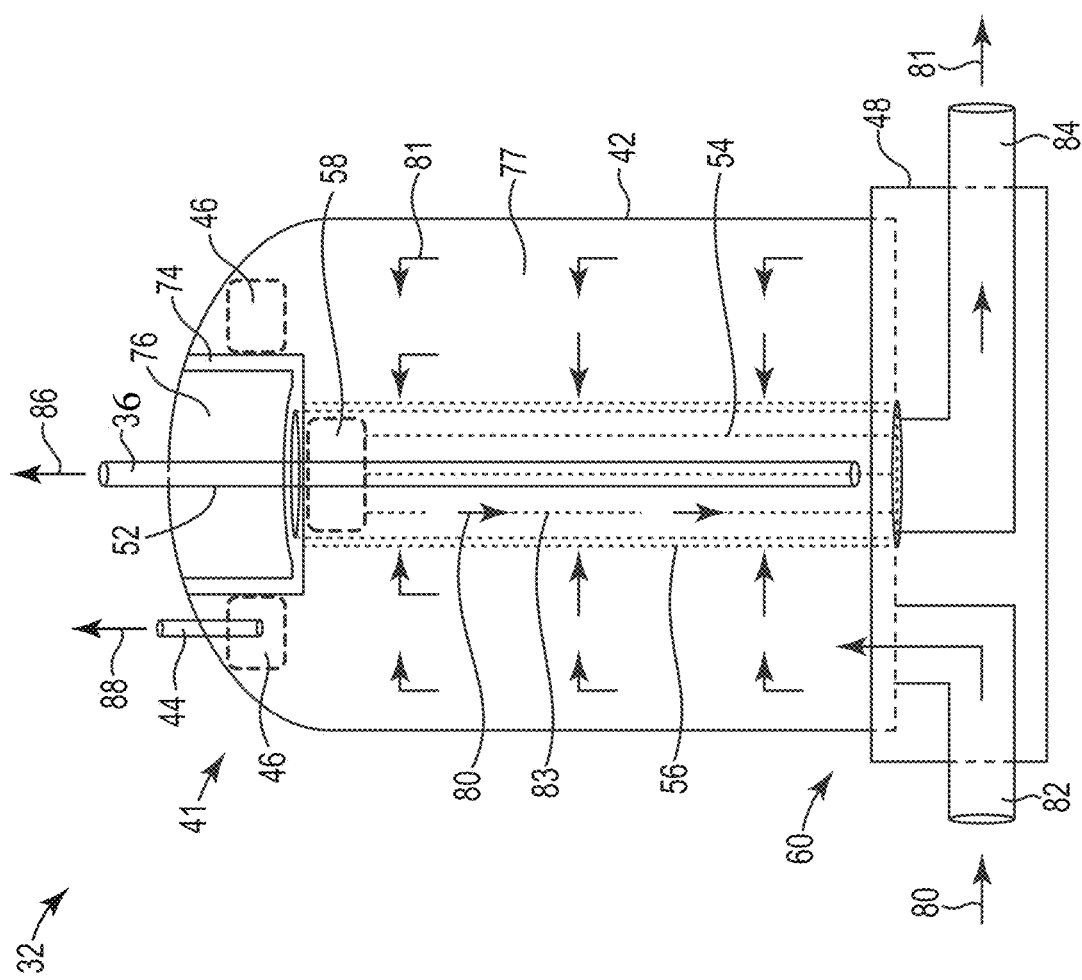
FIG. 4 is a schematic view of a filter apparatus in a bowl-up configuration with a core vent passing through a distal end of a filter housing.

A second example of a liquid filtering assembly (32) as described, that includes a top-mounted core vent, is described at FIG. 4. Assembly 32 of FIG. 4 includes structures and functionality that are comparable to those of apparatus 30, but with longer core vent 36 of assembly 32 replacing shorter core vent 34 of assembly 30. Core vent 36 extends from an exterior location, through distal end of housing 42, into core volume 83, and to a lower portion of core volume 83. Core vent 36 includes a lower end located at the lower portion of core volume 83, with an opening at that end. While not specifically shown, one or more additional openings may be present along the length of core vent 36, including one or more openings that may be located at the upper portion of core volume 83. An optional and potentially preferred feature of core vent 36 that is not specifically illustrated, is an ESD mitigation feature as described.

Each of assemblies 30 and 32 shows a liquid filtering assembly that includes a core vent (34 and 36, respectively) that allows for venting of a core volume 83 through a flow path and conduit that generally align with a central axis of cartridge assembly 56, which extends between an exterior location to an upper portion of core volume 83 (assembly 30) or to a lower portion of core volume 83 (assembly 32), when the assembly is in the bowl-up configuration.

As illustrated at FIGS. 3 and 4, assembly 30 or 32 receives unfiltered liquid 80 that enters the housing 41 through inlet 82. Once unfiltered liquid 80 is received, the liquid flows and is distributed within housing volume 77 between cartridge assembly 56 and an interior side of bowl 42. Filter membrane 54 of filter cartridge 56 is in the fluid flow path between the inlet 82 and outlet 84, so that fluid passing into the inlet 82 is filtered before exiting assembly 30 through outlet 84.

As illustrated by arrows, a unfiltered liquid 80 flows through filter membrane 54 supported by filter cartridge 56, whereby various contaminants, particles, or impurities present in the unfiltered liquid may be removed from the unfiltered liquid by mechanical or chemical features of the filter membrane (e.g., pores, reactive functional groups, adsorption onto a membrane surface). Filtered liquid (a.k.a. "permeate") 81 can pass from the core volume 83 through outlet 84 to exit housing 41. Various pumps, valves, flow regulators, and conduits, etc., can be effective to cause a desired volume and rate of fluid to flow through the assembly.

During use, a less dense fluid phase such as a gas can separate from the liquid phase (80, 81) passing through assembly 30 or 32, before or after the liquid passes filter membrane 54. Fluid 80 in a liquid phase upon entering housing volume 77, but may contain air bubbles or dissolved gas. The air bubbles from dissolved gas can be formed, for example due to a fluid pressure drop during filtration. The gas can form and accumulate in a housing gas pocket 46 in an upper portion of the housing volume 77. In addition, a core side gas pocket 58 may form and accumulate within gas side space 83 at an upper portion of gas side space 83. The gas phase, being less dense than the liquid phase of liquid 80, 81, will accumulate above the liquid from which the gas phase is separated.

Housing gas pocket 46 located at the upper portion of housing volume 77 can be vented as gas 88 to an exterior of the housing 41 via housing vent 44. Gas in pocket 58, located at the upper portion of gas side space 83, can be vented as gas 86 to an exterior location through core vent 34 (at FIG. 3) or through vent 36 (at FIG. 4). By providing vents on both of the housing space side 77 and the core volume side 83 of filter membrane 54, substantially all accumulated gas within apparatus 30 can be beneficially vented to an exterior location.

Still with reference to FIGS. 3 and 4, at a distal (upper) end of bowl 42 of assembly 30, a sealed upper space 76 is defined in part by an interior surface of bowl 42, e.g., by partition 74 as illustrated. Partition 74 separates housing volume 77 from sealed upper space 76, which includes vent 34 or vent 36. Sealed upper space 76 can also be defined in part by a surface of a distal end of cartridge assembly 56, which contacts a surface of partition 74 when the cartridge assembly is installed at the interior of housing bowl 42.

Upper space 76 can be shaped and positioned at a location above cartridge assembly 56, and can provide a liquid-tight space between the distal end of filter cartridge 56 and an inner surface of the housing bowl, at a distal end of the housing bowl. As shown at FIGS. 3 and 4, vents 34 and 36 are each sealed from upper space 76 while passing through upper space 76. In other example embodiments, a vent 34 or 36 can be in fluid communication with upper space 76.

The cartridge assembly distal end may interface with partition 74 by any useful manner that forms a liquid-tight cartridge assembly-bowl seal. The engagement may be, e.g., by threadable interface, a press-fit engagement, a snap-fit engagement, or the like.

Figure 5:
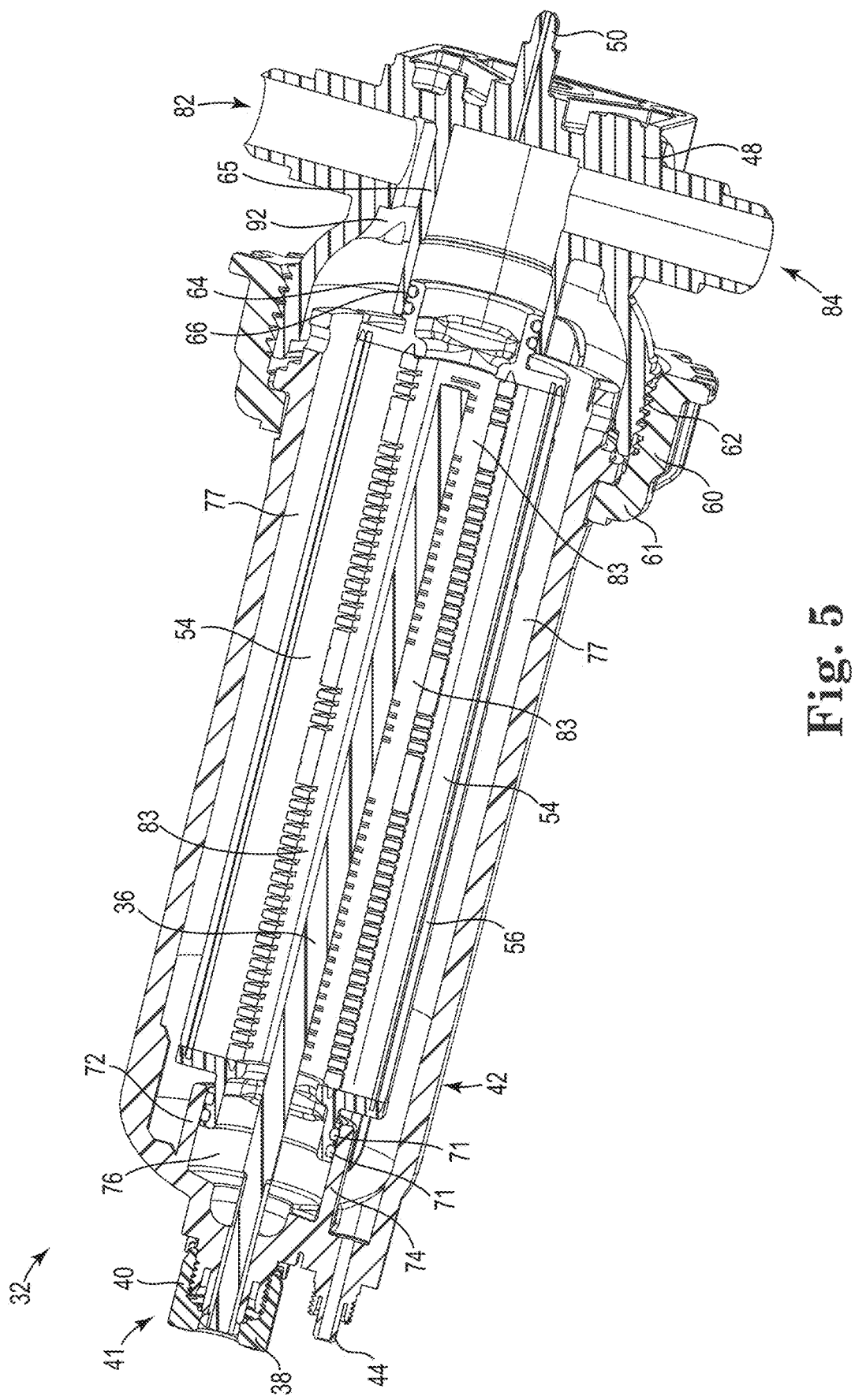
FIG. 5 is a cross-sectional view of an example filter assembly of FIG. 4.
Figure 6:
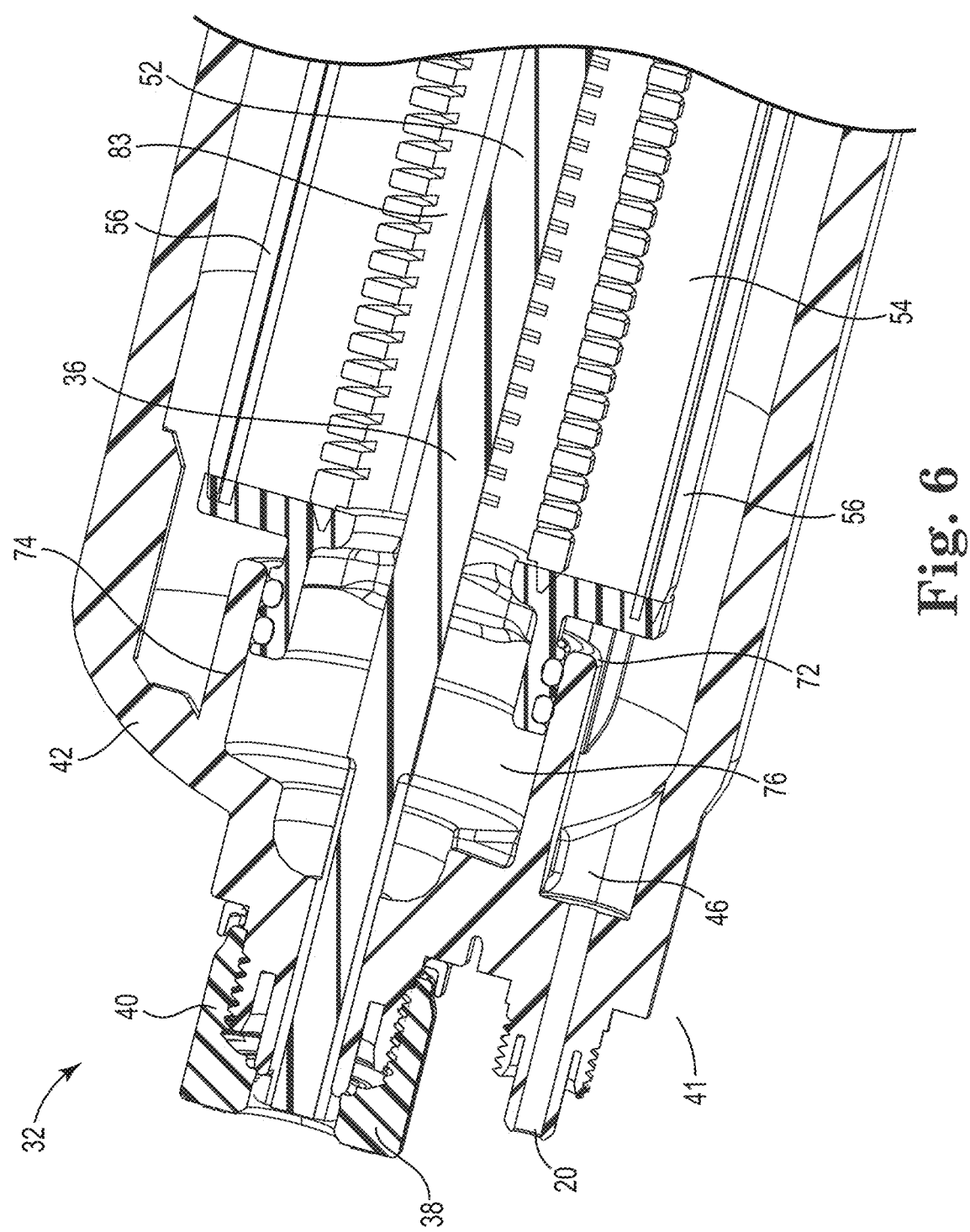
FIG. 6 is a close-up view of a portion of the filter assembly of FIG. 5.
Figure 7:
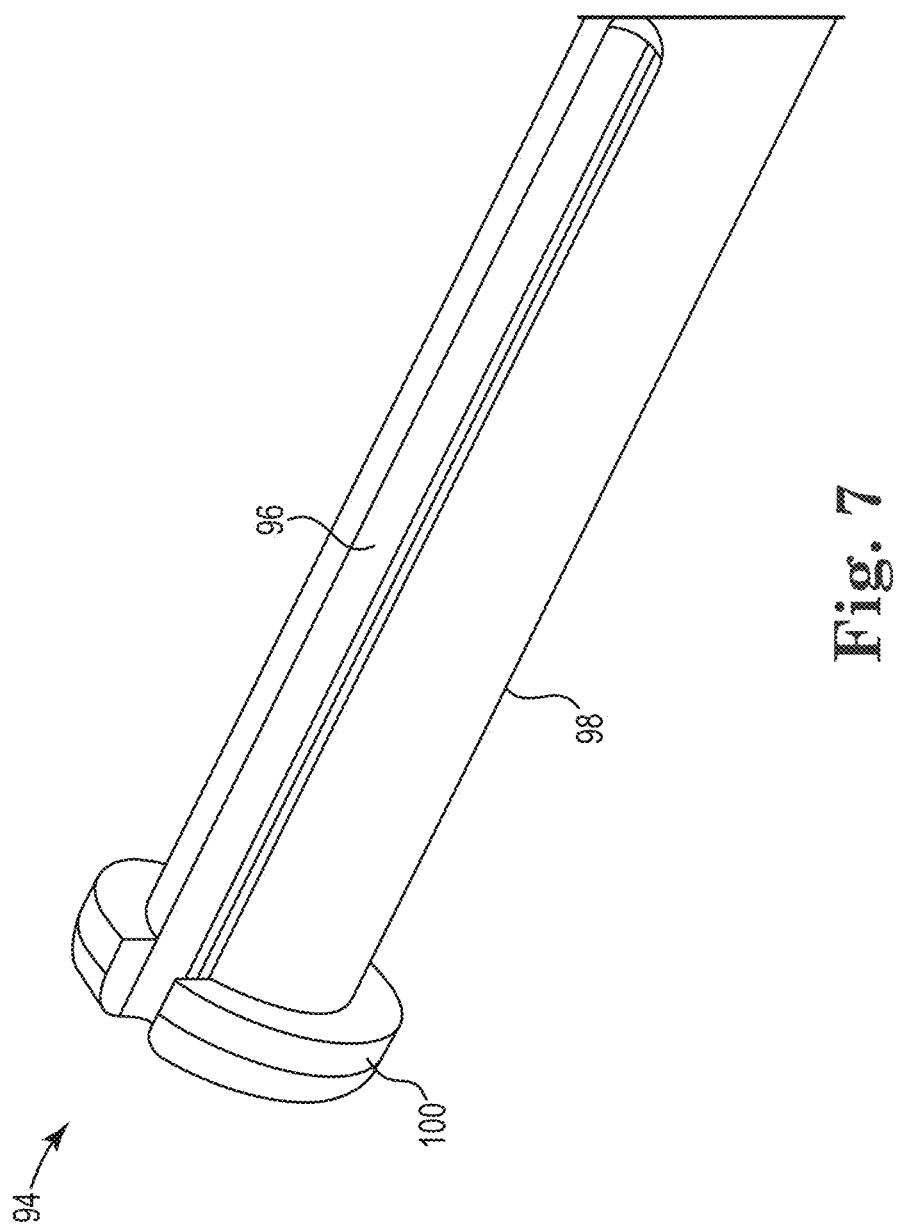
FIG. 7 is a detailed view of a core vent adapted to include optional an electrostatic discharge mechanism.

FIGS. 5, 6, and 7 are illustrations of example assembly 32 of FIG. 4, using like number designations for like features and structures, and with additional detail, particularly with respect to the cartridge assembly-bowl seal, the cartridge assembly manifold seal, and an ESD mitigation feature.

FIGS. 5 through 7 show assembly 32 that that includes a core vent 36 that extends to a lower (proximal) portion of core volume 83, meaning a portion that is at half, third, or quarter of core volume 83 closest to manifold 48. Vent 36 can be any structure that provides for fluid to pass along the vent, from core volume side 83 to an exterior location. Vent 36 may be a hollow tube, or may alternately be a slotted tube (see FIG. 7) that functions as a tube for venting, as well as an ESD mitigation feature. Vent 36 can be configured to provide venting of core volume 83 to an exterior location as described herein. As one optional vent 36, a vented (slotted) probe 96 as shown at FIG. 7 may be used (see discussion of FIG. 7, below). Alternatively, vent 36 can be a hollow tube or pipe that includes one or more apertures or holes along the length of vent 36, such that various depths of the core volume 83 are vented, including at an upper portion. Either type of vent structure may be made in part or completely of conductive polymer, e.g., conductive fluoropolymer, to make up art of an ESD mitigation feature.

FIGS. 5 and 6 show filter assembly 32 of FIG. 4 in greater detail. In particular, these Figures show examples of press-fit type seals used for each of a cartridge assembly-bowl seal 72 and a cartridge assembly-manifold seal 64.

Cartridge assembly-bowl seal 72 is shown as a seal between a cylindrical surface of a distal end of cartridge assembly 56, and an opposing interior cylindrical surface of housing bowl 42 that is located on an inner cylindrical surface of partition 74. Between these two opposed surfaces, when engaged, are two "O-ring" type gaskets, 71 and 71, which provide a fluid-tight seal between the surfaces. This cartridge assembly-bowl seal also provides a fluid tight seal of the sealed upper space 76 from the housing volume 77.

The cartridge assembly-manifold seal (64) is shown as a seal between a cylindrical surface of a proximal end of cartridge assembly 56, with an opposing interior cylindrical surface of manifold 48, which is part of partition 65. Between these two opposed surfaces, when engaged, are two "O-ring" type gaskets, 66 and 66.

As shown, assembly 32 also includes a core vent upper fitting 38 that includes threads 40 for attachment to a distal end or portion of bowl 42. Fitting 38 can be threadably tightened to secure core vent 36 of assembly 32 to the distal end of bowl 42, and can provide a sealed fitment at the distal end of the bowl 42. The fitting 38 connection to bowl 42 and vent 36 can be part of an ESD mitigation feature, such as by functioning as a portion of a circuit between an ESD feature located on vent 36, and electrical ground (not shown).

Also shown are examples of details related to manifold-bowl seal 60. For example, as shown in FIGS. 5 and 6, manifold 48 is provided with external threads 62 for manifold-bowl seal 60, and a fitting 61 is shown that threads to manifold threads 62 to securely attach bowl 42 to manifold 48. When cartridge assembly 56 and bowl 42 are tightened against manifold 48 by operation of threaded fitting 61, housing volume 77 is in fluid communication with inlet 84 and core volume 83 is in communication with outlet 84.

Cartridge assembly 56 and its filter membrane 54 can include structures as generally known in the filtration arts, and as described herein, particularly including a filter membrane useful for filtering fluids and liquids used in semiconductor and microelectronic device processing.

A lower core vent 50 between outlet 84 of manifold 48 and an exterior location can optionally be provided on the manifold 48. As assembly 32 is preferably mounted in a bowl-up configuration, vent 50 can be provided as a drain or high-pressure fluid release valve, and is optional.

FIG. 7 shows an example vent (e.g., vent 36) in an embodiment as a slotted core vent or probe 94 comprising a venting slot 96, and having a probe body 98. As shown, probe 94 is not hollow, although other embodiments can implement a hollow, tube-like probe or other vent 36. A ring 100 is also provided on the probe 94. Probe 94 can be conductive, to provide ESD mitigation as described herein. Probe 94 may optionally stay assembled to bowl 42 and may not be removed or replaced with cartridge assembly 56. Probe 94 is an example of vent 36, but represents only a non-limiting example of the vent 36. Vent 36 can be substantially tubular, hollow, perforated, or otherwise shaped to allow for venting of a core volume when installed as part of an liquid filtering apparatus.

A liquid filtering apparatus of the present description can be used for methods of removing undesired particles, particulates, contaminants, or impurities from a source of unfiltered liquid. The particles or impurities may include inorganic and organic materials such as dissolved organic compounds, dissolved metals, solid metals, and other solid organic or inorganic materials. The described methods are performed by causing unfiltered liquid to flow into the apparatus, e.g., through an inlet as described, and through a filter membrane supported within the apparatus by a cartridge assembly. After passing through the filter membrane, the filtered liquid ("filtrate") can pass out of the apparatus, e.g., through an outlet as described. During use of a liquid filtering apparatus as described, if gaseous fluid accumulates at an upper portion of the core volume, a venting feature as described can be used to that volume of gaseous fluid from the core volume.

A liquid filtering apparatus as described may be useful for processing various types of fluids, for various uses in different industries. As one example, the presently described apparatuses and methods may be effective for preparing purified liquids for use in semiconductor and microelectronic processing, for example in methods used to manufacture solar panels, flat panel displays, and semiconductor and microelectronic devices. The liquids may be used in a process such as photolithography, bulk chemical delivery, chemical mechanical processing (CMP), wet etching, or cleaning, among other types of processes.

During use, a filter membrane of a cartridge assembly removes impurities from a flow of liquid through the membrane. The filter has a limited operational lifetime, and after an amount of unfiltered liquid has been passed through the filter membrane, the membrane must be replaced. A method of changing the cartridge assembly and an attendant filter membrane in a liquid filtering apparatus that is installed in a bowl-up configuration can include a step of draining liquid from the housing, including from both the housing volume and the core volume. With the liquid drained from both spaces, the manifold-bowl seal can be disassembled. The bowl may then be vertically lifted away from the manifold to separate the bowl from the manifold.

In example methods of replacing a cartridge assembly, and depending on the type of engagement used to produce the cartridge assembly-manifold seal, the cartridge assembly may be required to remain in place while the bowl is removed, with the cartridge assembly proximal end remaining engaged with the manifold. With these designs, the cartridge assembly-bowl seal at the distal end of the cartridge must be disassembled before removing the cartridge assembly from the manifold. With the cartridge assembly proximal end still engaged with the manifold, the bowl is lifted to a height that places the open end (lower end) of the bowl above the height of the distal end (upper end) of the cartridge assembly (which is engaged with the manifold) to uncover the cartridge assembly. The cartridge assembly may subsequently be removed from the manifold by disassembling the cartridge assembly-manifold seal at the proximal end of the cartridge assembly. Then, a replacement cartridge assembly may be engaged with the manifold by engaging the cartridge assembly proximal end with the manifold. The bowl may then be re-installed over the manifold and cartridge assembly.

With this example method of replacing a filter cartridge of a liquid filtering apparatus, a vent feature as described, such as a vent 34 or 36 of FIG. 3, 4, 5, or 6, may remain engaged with the bowl during replacement of the cartridge assembly. A vent as described may be engaged and secured at a location of the bowl distal end, and is not required to be removed and replaced with the cartridge assembly. In other embodiments, a vent may be considered to be part of the cartridge assembly, and may be removed from the housing and replaced as part of the cartridge assembly.

With some installed liquid filtering apparatuses, a preferred method of replacing a cartridge assembly of a liquid filtering apparatus installed in a bowl-up configuration may desirably overcome the need for lifting the bowl to a height of the bowl open end that is above the height of the cartridge assembly, while the cartridge assembly proximal end remains engaged with the manifold. For example, in certain types of semiconductor and microelectronic device processing systems (e.g., "tools") and their locations of use (a clean room), the value of space is substantial, including space above a filtering apparatus.

Advantageously, according to the present description, certain examples of liquid filtering apparatuses are capable of being disassembled for the purpose of replacing a cartridge assembly, without lifting the bowl to a height (of the bowl open end) that is above the height of the cartridge assembly, to uncover and expose a cartridge assembly that remains engaged with the manifold. In specific, various apparatuses as described include a combination of a manifold and a cartridge assembly proximal end that can be assembled to form a cartridge assembly-manifold seal by pressing the cartridge assembly proximal end into contact with a surface of the manifold. The pressing motion of the cartridge assembly toward the manifold to form the seal may be exclusively along the central axis of the cartridge assembly, toward the manifold, and forming the seal does not require any other direction of movement of the cartridge assembly such as rotation of the cartridge assembly about the central axis of the cartridge assembly. The seal does not include a threaded engagement, a twist-locking engagement, or any other engagement that requires movement of the cartridge assembly in any direction other than along the central axis.

This type of a preferred press-fit seal, as described (and as illustrated in detail at FIG. 5), can be disassembled by an opposite movement that includes movement of the cartridge exclusively along the central axis of the cartridge assembly away from the manifold, i.e., upward. The require distance of the movement is limited, and only requires that the proximal end of the cartridge assembly be lifted a distance above the manifold to provide physical, vertical clearance (space) between the proximal end of the cartridge assembly and the manifold. Upon disassembling both the bowl-manifold seal and the cartridge assembly-manifold seal, and lifting the bowl and the cartridge assembly to a height that provides vertical clearance between both the bowl and the manifold and the proximal end of the cartridge assembly and the manifold, the bowl and the cartridge assembly may be moved together, laterally away from the space above manifold, with the cartridge assembly remaining located at least partially within (or substantially within) the interior space of the bowl. The lateral movement produces lateral clearance between the manifold and the bowl, and the manifold and the cartridge assembly.

Upon removing the cartridge assembly and the bowl away from the manifold, the cartridge assembly distal end may remain connected to the interior of the distal end of the bowl, at the cartridge assembly-bowl seal. This seal can be disassembled to allow the cartridge assembly to be removed from the interior space of the bowl. The motion required to disassemble the cartridge assembly-bowl seal will depend on the type of seal, e.g., threaded, twist-locking, or press-fit. For a press-fit seal, e.g., as illustrated at FIGS. 5 and 6, the seal may be disassembled exclusively by a pulling motion along the central axis of the cartridge assembly, to move the cartridge assembly away from the bowl distal end.

With this example method of replacing a filter cartridge of a liquid filtering apparatus, a vent feature as described, such as a vent 34 or 36 of FIG. 3, 4, 5, or 6, may remain engaged with the bowl during replacement of the cartridge assembly. A vent as described may be engaged and secured at a location of the bowl distal end, and is not required to be removed and replaced with the cartridge assembly. In other embodiments, a vent may be considered to be part of the cartridge assembly, and may be removed from the housing and replaced as part of the cartridge assembly.

In a first aspect, a liquid filtering apparatus comprises: a bowl comprising an open end, a distal end opposite of the open end, and an interior that extends between the open end and the distal end; a manifold that is capable of sealingly engaging the open end of the bowl, the manifold comprising a fluid inlet and a fluid outlet; a cartridge assembly disposed at the interior, the cartridge assembly comprising a filter membrane, a cartridge assembly proximal end, and a cartridge assembly distal end, the cartridge assembly proximal end including a surface that is adapted to contact a surface of the manifold to form a cartridge assembly-manifold seal, and the cartridge assembly distal end including a surface that is adapted to contact an interior surface of the bowl to form a cartridge assembly-bowl seal at the interior; a core volume at a central inner side of the cartridge assembly; a housing volume at an outer side of the cartridge assembly between the cartridge assembly and the bowl; and a vent extending through the bowl distal end to the core volume to fluidly connect the core volume with an exterior of the liquid filtering apparatus.

In a second aspect according to the first aspect, the cartridge assembly has a central axis extending between the cartridge assembly proximal end and the cartridge assembly distal end, within the core volume, the cartridge assembly-manifold seal can be formed by pressing the cartridge assembly proximal end surface into contact with the surface of the manifold, with movement of the cartridge assembly along the central axis toward the manifold, and the cartridge assembly-manifold seal can be disassembled by pulling the cartridge assembly proximal end surface from the surface of the manifold, with movement of the cartridge assembly along the central axis away from the surface of the manifold.

In a third aspect according to the first or second aspect, the cartridge assembly has a central axis extending between the cartridge assembly proximal end and the cartridge assembly distal end, within the core volume, the cartridge assembly-bowl seal can be formed by pressing the cartridge assembly distal end surface into contact with the surface of the bowl, with movement of the cartridge assembly along the central axis toward the bowl, and the cartridge assembly-bowl seal can be disassembled by pulling the cartridge assembly distal end surface from the surface of the bowl, with movement of the cartridge assembly along the central axis away from the surface of the bowl.

In a fourth aspect according to the third aspect, the cartridge assembly-manifold seal includes an annular sealing gasket between the cartridge assembly proximal end surface and the surface of the manifold.

In a fifth aspect according to any of the preceding aspects, the vent is capable of being selectively opened and closed to selectively allow fluid communication between the core volume and the exterior.

In a sixth aspect according to any of the preceding aspects, the fluid inlet communicates with the housing volume, and the fluid outlet communicates with the core volume.

In a seventh aspect according to any of the preceding aspects, the vent comprises a conduit that has a first end and a second end, the first end is located at a distal portion of the core volume and the second end is located at the exterior.

In an eighth aspect according to any of the preceding aspects, the vent comprises a conductive material that electrically connects the core volume to electrical ground.

In a ninth aspect s method of filtering a liquid using a liquid filtering apparatus comprises: passing the fluid into the apparatus, wherein the apparatus comprises a housing that includes a manifold and a bowl, with the bowl situated vertically above the manifold, the housing comprising: the bowl, which comprises an open end, a distal end opposite of the open end, and an interior that extends between the open end and the distal end, the manifold, which is engaged with the open end of the bowl to form a manifold-bowl seal, the manifold comprising a fluid inlet and a fluid outlet, a cartridge assembly disposed at the interior, the cartridge assembly comprising a filter membrane, a cartridge assembly proximal end, and a cartridge assembly distal end, the cartridge assembly proximal end including a surface that is adapted to contact a surface of the manifold to form a cartridge assembly-manifold seal, and the cartridge assembly distal end including a surface that is adapted to contact an interior surface of the bowl to form a cartridge assembly-bowl seal at the interior, a core volume at a central inner side of the cartridge assembly, a housing volume at an outer side of the cartridge assembly between the cartridge assembly and the bowl, and a vent extending through the bowl distal end to the core volume to fluidly connect the core volume with an exterior of the housing; passing the liquid in the inlet, from the inlet through the housing volume, through the filter membrane, to the core volume, and then through the outlet, wherein gas accumulates at a distal region of the core volume; and releasing the gas through the vent.

In a tenth aspect according to the ninth aspect, the cartridge assembly has a central axis extending between the cartridge assembly proximal end and the cartridge assembly distal end, within the core volume, the cartridge assembly-manifold seal can be formed by pressing the cartridge assembly proximal end surface into contact with the surface of the manifold, with movement of the cartridge assembly along the central axis toward the manifold, and the cartridge assembly-manifold seal can be disassembled by pulling the cartridge assembly proximal end surface from the surface of the manifold, with movement of the cartridge assembly along the central axis away from the surface of the manifold.

In an eleventh aspect according to the ninth or tenth aspect, the cartridge assembly has a central axis extending between the cartridge assembly proximal end and the cartridge assembly distal end, within the core volume, the cartridge assembly-bowl seal can be formed by pressing the cartridge assembly distal end surface into contact with the surface of the bowl, with movement of the cartridge assembly along the central axis toward the bowl, and the cartridge assembly-bowl seal can be disassembled by pulling the cartridge assembly distal end surface from the surface of the bowl, with movement of the cartridge assembly along the central axis away from the surface of the bowl.

In a twelfth aspect according to the eleventh aspect, the cartridge assembly-bowl seal includes an annular sealing gasket between the cartridge assembly proximal end surface and the surface of the bowl.

In a thirteenth aspect according to any of the ninth through twelfth aspects, the fluid inlet communicates with the housing volume, and the fluid outlet communicates with the core volume.

In a fourteenth aspect according to any of the ninth through thirteenth aspects, wherein the vent comprises a conductive material that electrically connects the core volume to electrical ground.

In a fifteenth aspect, a method of replacing a cartridge assembly of a liquid filtering apparatus comprising a housing that includes a manifold and a bowl, with the bowl situated vertically above the manifold, the housing comprising: the bowl, which comprises an open end, a distal end opposite of the open end, and an interior that extends between the open end and the distal end, the manifold, which is engaged with the open end of the bowl to form a manifold-bowl seal, the manifold comprising a fluid inlet and a fluid outlet, a cartridge assembly disposed at the interior, the cartridge assembly comprising a filter membrane, a cartridge assembly proximal end, and a cartridge assembly distal end, the cartridge assembly proximal end including a surface that contacts a surface of the manifold to form a cartridge assembly-manifold seal, and the cartridge assembly distal end including a surface that contacts an interior surface of the bowl to form a cartridge assembly-bowl seal at the interior, a core volume at a central inner side of the cartridge assembly, a housing volume at an outer side of the cartridge assembly between the cartridge assembly and the bowl, and a vent extending through the bowl distal end to the core volume to fluidly connect the core volume with an exterior of the bowl, the method comprising: draining liquid fluid from the liquid filtering assembly, disassembling the manifold-bowl seal, vertically lifting the bowl and the cartridge assembly above the manifold to produce vertical clearance between the bowl and the manifold, and between the cartridge assembly and the manifold, and moving the bowl and the cartridge assembly together laterally to produce lateral clearance between the manifold and the bowl, and between the manifold and the cartridge assembly.

In a sixteenth aspect according to the fifteenth aspect, the cartridge assembly has a central axis extending between the cartridge assembly proximal end and the cartridge assembly distal end, within the core volume, the cartridge assembly-manifold seal can be formed by pressing the cartridge assembly proximal end surface into contact with the surface of the manifold, with movement of the cartridge assembly along the central axis toward the manifold, and the cartridge assembly-manifold seal can be disassembled by pulling the cartridge assembly proximal end surface from the surface of the manifold, with movement of the cartridge assembly along the central axis away from the surface of the manifold, the method comprising: disassembling the cartridge assembly-manifold seal by lifting the cartridge manifold vertically above the manifold.

The invention claimed is:

1. A method of filtering a liquid using a liquid filtering apparatus, the method comprising: passing the liquid into the liquid filtering apparatus, wherein the liquid filtering apparatus comprises a housing that includes a manifold and a bowl, with the bowl situated vertically above the manifold, the housing comprising:
    the bowl, which comprises an open end, a distal end opposite of the open end, and an interior that extends between the open end and the distal end,
    the manifold, which is engaged with the open end of the bowl to form a manifold-bowl seal, the manifold comprising a fluid inlet and a fluid outlet,
    a cartridge assembly disposed at the interior, the cartridge assembly comprising a filter membrane, a cartridge assembly proximal end, and a cartridge assembly distal end, the cartridge assembly proximal end including a surface that is adapted to contact a surface of the manifold to form a cartridge assembly-manifold seal, and the cartridge assembly distal end including a surface that is adapted to contact an interior surface of the bowl to form a cartridge assembly-bowl seal at the interior,
    a core volume at a central inner side of the cartridge assembly,
    a housing volume at an outer side of the cartridge assembly between the cartridge assembly and the bowl, and
    a vent comprising a conduit extending through the bowl distal end and into a portion of the core volume to fluidly connect the core volume with an exterior of the housing, the conduit having a first end and a second end, the first end disposed in the core volume, and the second end located at the exterior;
    passing the liquid in the inlet, from the inlet through the housing volume, through the filter membrane, to the core volume, and then through the outlet, wherein gas accumulates at a distal region of the core volume; and
    releasing the gas through the vent wherein the first end of the conduit is disposed in a lower portion of the core volume, the lower portion of the core volume being the portion of the core volume proximal to the open end of the bowl.

2. The method of claim 1, wherein:
    the cartridge assembly has a central axis extending between the cartridge assembly proximal end and the cartridge assembly distal end, within the core volume,
    the cartridge assembly-manifold seal can be formed by pressing the cartridge assembly proximal end surface into contact with the surface of the manifold, with movement of the cartridge assembly along the central axis toward the manifold, and
    the cartridge assembly-manifold seal can be disassembled by pulling the cartridge assembly proximal end surface from the surface of the manifold, with movement of the cartridge assembly along the central axis away from the surface of the manifold.

3. The method of claim 1, wherein:
    the cartridge assembly has a central axis extending between the cartridge assembly proximal end and the cartridge assembly distal end, within the core volume,
    the cartridge assembly-bowl seal can be formed by pressing the cartridge assembly distal end surface into contact with the surface of the bowl, with movement of the cartridge assembly along the central axis toward the bowl, and the cartridge assembly-bowl seal can be disassembled by pulling the cartridge assembly distal end surface from the surface of the bowl, with movement of the cartridge assembly along the central axis away from the surface of the bowl.

4. The method of any claim 3, wherein the cartridge assembly-bowl seal includes an annular sealing gasket between the cartridge assembly proximal end surface and the surface of the bowl.

5. The method of claim 1, wherein the fluid inlet communicates with the housing volume, and the fluid outlet communicates with the core volume.

6. The method of claim 1, wherein the vent comprises a conductive material that electrically connects the core volume to electrical ground.

7. A liquid filtering apparatus comprising:
    a bowl comprising an open end, a distal end opposite of the open end, and an interior that extends between the open end and the distal end;
    a manifold that is capable of sealingly engaging the open end of the bowl, the manifold comprising a fluid inlet and a fluid outlet;
    a cartridge assembly disposed at the interior, the cartridge assembly comprising a filter membrane, a cartridge assembly proximal end, and a cartridge assembly distal end, the cartridge assembly proximal end including a surface that is adapted to contact a surface of the manifold to form a cartridge assembly-manifold seal, and the cartridge assembly distal end including a surface that is adapted to contact an interior surface of the bowl to form a cartridge assembly-bowl seal at the interior;
    a core volume at a central inner side of the cartridge assembly;
    a housing volume at an outer side of the cartridge assembly between the cartridge assembly and the bowl; and
    a vent comprising a conduit extending through the bowl distal end and into a portion of the core volume to fluidly connect the core volume with an exterior of the liquid filtering apparatus, the conduit having a first end and a second end, the first end disposed in the core volume, and the second end located at the exterior wherein the first end of the conduit is disposed in a lower portion of the core volume, the lower portion of the core volume being the portion of the core volume proximal to the open end of the bowl.

8. The liquid filtering apparatus of claim 7, wherein:

the cartridge assembly has a central axis extending between the cartridge assembly proximal end and the cartridge assembly distal end, within the core volume, the cartridge assembly-manifold seal can be formed by pressing the cartridge assembly proximal end surface into contact with the surface of the manifold, with movement of the cartridge assembly along the central axis toward the manifold, and the cartridge assembly-manifold seal can be disassembled by pulling the cartridge assembly proximal end surface from the surface of the manifold, with movement of the cartridge assembly along the central axis away from the surface of the manifold.

9. The liquid filtering apparatus of claim 7, wherein:

the cartridge assembly has a central axis extending between the cartridge assembly proximal end and the cartridge assembly distal end, within the core volume, the cartridge assembly-bowl seal can be formed by pressing the cartridge assembly distal end surface into contact with the surface of the bowl, with movement of the cartridge assembly along the central axis toward the bowl, and the cartridge assembly-bowl seal can be disassembled by pulling the cartridge assembly distal end surface from the surface of the bowl, with movement of the cartridge assembly along the central axis away from the surface of the bowl.

10. The liquid filtering apparatus of claim 9, wherein the cartridge assembly-manifold seal includes an annular sealing gasket between the cartridge assembly proximal end surface and the surface of the manifold.

11. The liquid filtering apparatus of claim 7, wherein the fluid inlet communicates with the housing volume, and the fluid outlet communicates with the core volume.

12. The liquid filtering apparatus of claim 7, wherein the vent comprises a conductive material that electrically connects the core volume to electrical ground.

13. The method of claim 1, wherein the first end of the conduit is disposed in an upper portion of the core volume, the upper portion of the core volume being the portion of the core volume proximal to the distal end of the bowl.

14. The liquid filtering apparatus of claim 7, wherein the first end of the conduit is disposed in an upper portion of the core volume, the upper portion of the core volume being the portion of the core volume proximal to the distal end of the bowl.

* * * * *